US012560007B2

(12) United States Patent
Markovic

(10) Patent No.: US 12,560,007 B2
(45) Date of Patent: Feb. 24, 2026

(54) LOCKING DEVICE, DOOR ASSEMBLY HAVING SUCH A LOCKING DEVICE AND METHOD FOR INSTALLING SUCH A LOCKING DEVICE

(71) Applicant: GRETSCH-UNITAS GMBH BAUBESCHLAEGE, Ditzingen (DE)

(72) Inventor: Clive Markovic, Gerlingen (DE)

(73) Assignee: GRETSCH-UNITAS GMBH BAUBESCHLÄGE, Ditzingen (DE)

( * ) Notice: Subject to any disclaimer, the term of this patent is extended or adjusted under 35 U.S.C. 154(b) by 0 days.

(21) Appl. No.: 19/115,622

(22) PCT Filed: Jun. 21, 2023

(86) PCT No.: PCT/EP2023/066776
§ 371 (c)(1),
(2) Date: Mar. 26, 2025

(87) PCT Pub. No.: WO2024/068058
PCT Pub. Date: Apr. 4, 2024

(65) Prior Publication Data

US 2025/0257595 A1 Aug. 14, 2025

(30) Foreign Application Priority Data

Sep. 26, 2022 (DE) ..................... 20 2022 105 395.2

(51) Int. Cl.
*E05C 9/20* (2006.01)
*E05C 9/00* (2006.01)
*E05C 9/04* (2006.01)

(52) U.S. Cl.
CPC .................. *E05C 9/20* (2013.01); *E05C 9/04* (2013.01); *E05C 9/004* (2013.01)

(58) Field of Classification Search
CPC ... E05C 9/20; E05C 9/04; E05C 9/004; E05C 9/22; E05C 1/004; E05C 1/006;
(Continued)

(56) References Cited

U.S. PATENT DOCUMENTS 1,094,143 A * 4/1914 Hagstrom ........... E05B 65/0075 70/118
4,315,648 A * 2/1982 Labelle ..................... E05C 1/04 292/DIG. 60

(Continued)

FOREIGN PATENT DOCUMENTS

CH 703093 A2 11/2011
CN 104246101 A 12/2014

(Continued)

OTHER PUBLICATIONS

EP0647755 Espacenet machine translation claims and description (Year: 2025).*

*Primary Examiner* — Steven A Tullia
(74) *Attorney, Agent, or Firm* — Perry + Currier Inc.

(57) ABSTRACT

The invention relates to a locking device (10) for a door leaf (204) of a door assembly (200), having a faceplate (12), a drive means (14) attached to the face plate (12), and at least one drive rod (21, 22) extending along a longitudinal direction (20), wherein the drive rod (21, 22) can be driven by the drive means (14) and can be displaced along the longitudinal direction (20) when driven by the drive means (14), wherein a respective coupling means (25) for coupling to a drive bolt (26, 27) is attached to the at least one drive rod (21, 22), wherein the coupling means (25) has a receptacle (30) in which the drive bolt (26, 27) can be inserted with an end section (26'), wherein the coupling means (25) and the drive bolt (26, 27) are configured such that the drive bolt (26, 27) is coupled to the coupling means (25) by latching when the end section (26') is inserted into the receptacle (30).

(Continued)

Figure 1A:
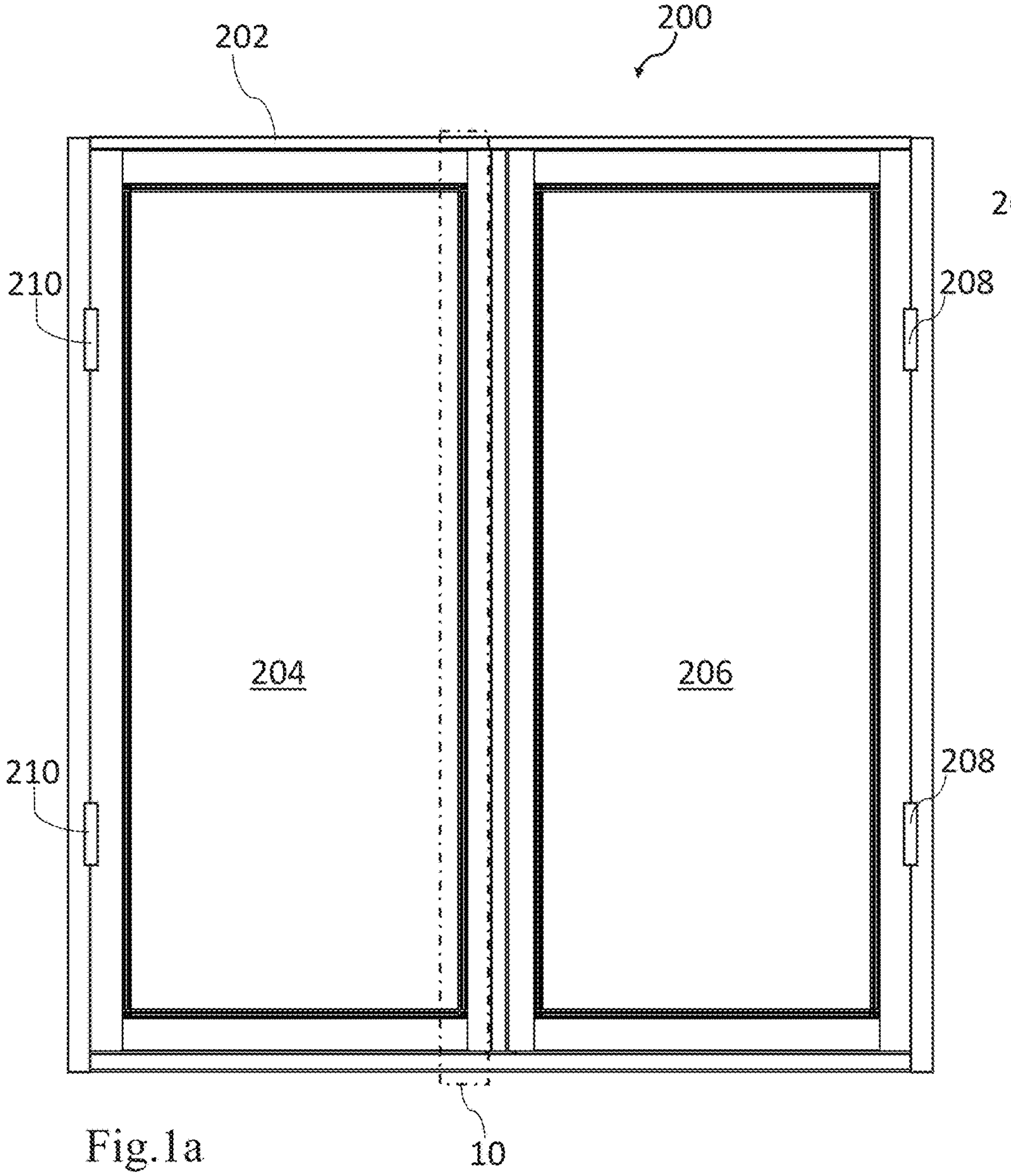

A door assembly (200) and a method for installing a locking device (10) on the door assembly (200) are disclosed.

16 Claims, 9 Drawing Sheets

(58) Field of Classification Search
CPC ..... E05C 1/08; E05C 1/12; E05C 7/04; E05C 7/045; E05B 9/002; E05B 63/081; E05B 63/0056; E05B 2015/0403
USPC .................................................... 70/107, 189
See application file for complete search history.

(56) References Cited

U.S. PATENT DOCUMENTS

| | | | | | |
|---|---|---|---|---|---|
| 4,368,905 | A * | 1/1983 | Hirschbein | E05B 65/1046 | 292/DIG. 60 |
| 4,907,908 | A * | 3/1990 | Gerhard | E05C 9/20 | 403/380 |
| 5,290,077 | A * | 3/1994 | Fleming | E05C 9/047 | 292/DIG. 60 |
| 5,373,716 | A * | 12/1994 | MacNeil | E05C 9/1808 | 70/489 |
| 5,660,420 | A * | 8/1997 | Smith | E05C 9/20 | 292/DIG. 60 |
| 5,906,403 | A * | 5/1999 | Bestler | E05C 9/1808 | 292/DIG. 60 |
| 6,282,929 | B1 * | 9/2001 | Eller | E05C 9/026 | 70/109 |
| 6,457,751 | B1 * | 10/2002 | Hartman | E05C 1/04 | 49/366 |
| 6,971,686 | B2 * | 12/2005 | Becken | E05C 7/04 | 292/172 |
| 7,404,306 | B2 | 7/2008 | Walls et al. | | |
| 8,534,719 | B2 * | 9/2013 | Chow | E05B 53/00 | 292/336.3 |
| 9,051,763 | B2 * | 6/2015 | Taylor | E05C 9/20 | |
| 9,404,295 | B2 * | 8/2016 | Baczuk | E05C 1/10 | |
| 9,624,701 | B2 * | 4/2017 | Taylor | E05C 9/04 | |
| 10,808,424 | B2 * | 10/2020 | Criddle | E05B 47/02 | |
| 11,624,204 | B2 * | 4/2023 | Schaeffer | E05C 9/1875 | 292/109 |
| 12,264,506 | B2 * | 4/2025 | Geraci | E05B 63/20 | |
| 2005/0166647 | A1 | 8/2005 | Walls et al. | | |
| 2011/0163553 | A1 * | 7/2011 | Fleming | E05C 9/02 | 292/42 |
| 2012/0001443 | A1 * | 1/2012 | Mitchell | E05C 9/185 | 292/341.16 |
| 2013/0062892 | A1 * | 3/2013 | Chow | E05C 1/16 | 292/175 |

FOREIGN PATENT DOCUMENTS

| | | | | | |
|---|---|---|---|---|---|
| CN | 111648683 | A | | 9/2020 | |
| DE | 2222839 | A1 | | 11/1973 | |
| DE | 2504420 | A1 | * | 8/1976 | E05C 9/24 |
| DE | 2548140 | A1 | * | 5/1977 | E05C 9/20 |
| DE | 3836693 | A1 | * | 5/1990 | E05B 9/02 |
| DE | 9300178 | U1 | * | 1/1993 | E05C 9/20 |
| DE | 4334278 | A1 | * | 4/1995 | E05C 9/066 |
| DE | 3505379 | C2 | * | 3/1996 | E05C 9/047 |
| DE | 10106121 | A1 | * | 8/2002 | E05C 9/066 |
| DE | 10154477 | A1 | * | 5/2003 | E05C 9/20 |
| DE | 202005013991 | U1 | * | 2/2007 | E05B 63/185 |
| DE | 102009054644 | A1 | * | 6/2011 | E05B 3/0056 |
| DE | 102010061411 | A1 | * | 9/2011 | E05C 9/20 |
| DE | 102011050226 | A1 | | 11/2011 | |
| DE | 202012002743 | U1 | * | 6/2012 | E05B 63/20 |
| EP | 0556442 | A1 | * | 8/1993 | E05C 9/20 |
| EP | 0647755 | A1 | * | 4/1995 | E05C 9/066 |
| EP | 0785329 | A2 | * | 7/1997 | E05C 9/041 |
| EP | 0899401 | A2 | * | 3/1999 | E05C 9/041 |
| EP | 1340872 | A2 | | 9/2003 | |
| EP | 2362043 | A1 | * | 8/2011 | E05C 9/20 |
| EP | 2369106 | A2 | * | 9/2011 | E05C 9/20 |
| EP | 2405086 | A2 | | 1/2012 | |
| EP | 2754786 | A1 | * | 7/2014 | E05B 9/002 |
| EP | 3045624 | A1 | | 7/2016 | |
| EP | 3748109 | A1 | | 12/2020 | |
| FR | 2589533 | A1 | * | 5/1987 | E05B 79/12 |
| FR | 2610034 | A3 | | 7/1988 | |
| FR | 2662202 | A1 | * | 11/1991 | E05C 9/20 |
| GB | 1535032 | A | * | 12/1978 | F16B 21/06 |
| GB | 2168105 | A | * | 6/1986 | E05C 9/026 |
| GB | 2140888 | B | * | 11/1986 | F16B 21/04 |
| GB | 2211882 | A | * | 7/1989 | E05C 9/025 |
| GB | 2475638 | A | * | 5/2011 | E05B 15/021 |
| IT | 1241382 | B | * | 1/1994 | E05B 79/12 |
| WO | WO-2009095228 | A1 | * | 8/2009 | E05B 17/0004 |
| WO | WO-2021048881 | A1 | * | 3/2021 | E05B 63/0056 |

* cited by examiner

LOCKING DEVICE, DOOR ASSEMBLY HAVING SUCH A LOCKING DEVICE AND METHOD FOR INSTALLING SUCH A LOCKING DEVICE

The invention relates to a locking device for a door leaf of a door assembly, having the features of the preamble of claim 1. In addition, the invention relates to a door assembly having a frame and at least one door leaf pivotably mounted on the frame, having the features of the independent claim.

Locking devices of the type mentioned at the outset are known from the prior art, for example from EP 3 748 109 A1. Therein, a locking device is disclosed-having a faceplate, a main lock attached to the faceplate and multiple secondary locks attached to the faceplate, which are coupled to the main lock via drive rods. This allows a safe and reliable locking to be achieved. Installation on the door leaf is usually carried out with the locking device fully preassembled. This places corresponding demands on the millings in the door leaf. Maintenance or replacement of lock components requires removal and, if necessary, at least partial disassembly of the locking device.

EP 3 045 624 A1 discloses a lock that can be mounted on a leaf and has a locking element, wherein the locking element can be actuated via a lock mechanism. The lock also has an interface for connecting a drive bolt apparatus with a locking bar. The interface has an attachment element connected to the lock mechanism and an opening arranged in the lock housing of the lock, wherein, when the drive bolt apparatus is connected, a gearing element passes through the opening and is connected to the attachment element. Disassembly is necessary to release the drive bolt apparatus from the lock.

The invention is based on the object of facilitating installation and maintenance of a locking device. In particular, it is desirable that one or more drive bolts can be easily coupled to a drive means of the locking device and uncoupled when required.

The invention achieves this object by means of a locking device having the features of claim 1.

The locking device is designed and/or intended for a door leaf of a door assembly. The locking device has a faceplate, a drive means attached to the faceplate, and at least one drive rod extending along a longitudinal direction (the faceplate longitudinal direction and/or drive rod longitudinal direction).

The at least one drive rod can be driven by means of the drive means and, when driven by means of the drive means, can be displaced along the longitudinal direction.

A coupling means for coupling a drive bolt is attached to the at least one drive rod. The coupling means has a receptacle into which the drive bolt can be inserted with an end section. The coupling means and the drive bolt are each designed in such a way that the drive bolt is coupled to the coupling means or fastened to the coupling means by latching when the end section is inserted into the receptacle. In other words, when the end section is inserted into the receptacle, the drive bolt is locked onto and/or with the coupling means (creating a positive connection in the form of a locking connection).

The proposed locking device enables the drive bolt to be automatically coupled and/or connected to the coupling means without the need for screws or other installation steps. The coupling is achieved by simply plugging together the drive bolt and coupling means. As a result of the simplified installation, installation time can be reduced. Due to the comparatively simple movement of the coupling (inserting and/or plugging together), installation of the locking device can be automated much more easily.

The receptacle into which the drive bolt can be inserted with an end section is, preferably exclusively, open in the longitudinal direction, in particular facing away from the drive means.

In a preferred embodiment, the coupling means can be designed such that the coupling of the drive bolt to or with the coupling means can be reversibly released. In other words, after locking onto or with the coupling means, the drive bolt can be reversibly released from the coupling means. This facilitates dismantling and/or maintenance of the drive bolt(s).

Advantageously, the coupling means can have a housing in which a locking element for coupling the drive bolt is displaceably mounted, wherein the locking element can be displaced between a coupling position in which the locking element engages in the receptacle along a displacement direction for coupling with the drive bolt, and a release position in which the locking element releases the receptacle for decoupling the drive bolt (the locking element is at least partially or completely displaced out of the receptacle in the release position). The locking element enables a structurally simple and stable coupling of the drive bolt to the coupling means. If an end section and/or insertion section of the drive bolt is inserted or plugged into the receptacle, the locking element can be brought into the coupling position. The locking element can then engage in an opening and/or a passage formed in the end section of the drive bolt in order to couple the drive bolt.

Specifically, the displacement direction along which the locking element is displaceable can be oriented orthogonally to the longitudinal direction along which the at least one drive rod extends. Irrespective of this, the coupling means is preferably designed such that the locking element is displaced towards the drive rod in the release position and/or is displaced away from the drive rod in the coupling position. In other words, the locking element is further away from the drive rod in the coupling position than in the release position.

In an expedient manner, the locking element can be preloaded into the coupling position by means of a spring element, in particular by means of a preferably helical compression spring, in particular away from the drive rod. This ensures that the locking element is reliably held in the coupling position. In addition, an automatic locking or latching of the drive bolt on the coupling means is facilitated. A spring receptacle or spring receptacle sections can be formed in the housing of the coupling means to accommodate the spring element. The spring element can be supported at one end on the locking element and at the other end on a housing section or on the drive rod to which the coupling means is attached.

In a preferred embodiment, the locking element can have an insertion bevel, so that the locking element can be displaced from the coupling position towards the release position by inserting the end section of the drive bolt into the recess. This facilitates automatic coupling of the drive bolt to the coupling means. The locking element can be lifted out of the coupling position by inserting or pushing-in the end section of the drive rod.

Advantageously, the locking element can have a first profile feature at its distal end (facing the receptacle of the coupling means), wherein the receptacle can have a second profile feature corresponding to, in particular complementary to, the first profile feature, wherein the first profile feature and the second profile feature engage with one another when the locking element is in the coupling position. This allows "jamming protection" to be established, since the engagement of the first profile feature and the second profile feature can largely prevent "jamming" of the locking element when inserting and/or pulling out the drive bolt. The first profile feature (locking element) can be designed as a recess with wall sections projecting beyond the recess on the edge. The second profile feature can be designed as a projection with a recess on the edge, e.g. in a U-shape.

Conveniently, the locking element can have a threaded section at its proximal end (facing the drive rod), and the drive rod and/or the faceplate can each have a passage aligned with the threaded section, so that an actuating element which has a counter-threaded section corresponding to the threaded section can be guided through the passage and coupled to the threaded section. This allows the locking element to be operated via the drive rod and/or the faceplate "from the outside". Thus, the locking element can be actuated (through the faceplate and/or drive rod) by means of the coupled actuating element, e.g. moved from the coupling position to the release position. This allows the drive bolt to be uncoupled or removed when the locking device is installed on or in a door assembly (no removal or disassembly of the locking device required).

Specifically, the threaded section can be designed as a bore with an internal thread and/or the actuating element with counter-threaded section can be designed as a screw with an external thread. This contributes to a compact, structurally simple and stable coupling of the actuating element to the locking element.

Preferably, the bore with internal thread can be formed in a pin-shaped section, preferably protruding from the locking element, wherein the spring element surrounds the pin-shaped section. This allows a particularly compact arrangement of the spring element, in particular the compression spring, and the bore with internal thread. The screw with external thread can thus be passed through the open interior ("eye") of the spring element and screwed into the bore with internal thread.

Specifically, the locking element can have a cross-section which is delimited by two opposing, preferably parallel, flat sides and two opposing narrow sides connecting the flat sides, wherein the narrow sides have a rounded contour. This contributes to an improved support of the locking element in the housing of the coupling means, wherein the housing can be designed with comparatively low wall thicknesses. Each rounded contour of the narrow sides can be arched or semicircular. A locking element guide opening can be formed in the housing of the coupling means, which at least partially has a cross-section complementary to the locking element. Spring receptacle sections for the spring element can be formed in flat sides of the locking element guide opening.

In a preferred embodiment, the receptacle can be arranged on the coupling means in such a way that a drive bolt coupled to the coupling means is arranged offset from the drive rod on the side of the drive rod facing away from the faceplate. This allows the drive bolt to be positioned offset relative to the drive rod or the faceplate. This makes it possible to install the drive bolt in a concealed position (the drive bolt is set into the interior of the door leaf, e.g. in a drive bolt channel in the door leaf that is closed off on the side and open at the end).

Conveniently, the housing of the coupling means can have a flange section for fastening the coupling means to the drive rod, in particular by riveting or screwing. This allows a structurally simple and stable attachment of the coupling means to the drive rod.

Advantageously, the drive bolt can have an end section (insertion section), a connecting section and/or a locking section. The end section (insertion section) is used to connect the drive bolt to the coupling means. The locking section is used to create a locking engagement with a door frame (locking section protrudes from the top of a leaf or door leaf) or with the floor (locking section protrudes from the bottom of a leaf or door leaf). The locking section may have a greater thickness than the end section and/or the connecting section. The connecting section is located between the end section (insertion section) and the locking section and connects the end section with the locking section. In the end section (insertion section), one or more clearances or passages can be formed for engagement with the locking element.

The locking section and the connecting section can each have a (corresponding) toothing by means of which the two sections can be or are coupled to one another. This contributes to a particularly stable coupling of the locking section and the connecting section. Optionally, the locking section and the connecting section can be designed such that they can be coupled together in different axial overlaps. This allows the length of the drive bolt to be adjusted by coupling the locking section and the connecting section with different (axial) overlaps. Alternatively, the locking section and the connecting section can be fixed to each other, e.g. riveted.

Within the scope of one possible embodiment, the drive means which drives the at least one drive rod can be an electric motor drive.

It is also conceivable that the drive means is designed as a mortise lock with one or more locking elements (latch and/or bolt), wherein the mortise lock has a lock nut and/or a locking cylinder and the lock gear of the mortise lock can be actuated via at least one or both of these components. When the lock gear is driven, one or more drive rods are also driven. The mortise lock can be arranged (as an "active lock", so to speak) on an active leaf (passage leaf).

The drive means can also be designed as a passive lock with latch receptacle and/or bolt receptacle, which are preferably equipped with a latch and/or bolt ejector. The passive lock can be operated by means of an actuating device, e.g. a handle, and a lock gear of the passive lock can be driven via this. When the lock gear is driven, one or more drive rods are also driven.

The locking device can optionally have an insertion or centering aid. The insertion or centering aid can be arranged and/or fastened in a drive rod channel of a door assembly. The insertion or centering aid can be arranged and/or fastened in a fixed position in a bolt channel, wherein the insertion or centering aid has a passage for the drive bolt. The passage of the insertion or centering aid can widen in the opposite direction to the insertion direction, e.g. starting from the drive bolt cross-section, preferably conically (conical insertion section of the passage). This allows a drive bolt to be inserted with its free end (end section) through the described insertion section into the passage and thus centered. This makes it easier to insert the drive bolt into the coupling means receptacle.

The receptacle of the coupling means can be designed as a slot and/or receiving slot for the end section.

Irrespective of this, the coupling means receptacle may have an insertion bevel. The insertion bevel can widen in the opposite direction to the insertion direction of the drive bolt, preferably conically (beveling of the opening edge of the receptacle). This makes it easier to insert the drive bolt (end section) into the coupling means receptacle without additional components (the number of components of the locking device can be kept low).

As already indicated above, the locking device can have two drive rods, two coupling means and two drive bolts. The locking device can thus be designed as a locking device for a door leaf of a door assembly, with a faceplate, a drive means attached to the faceplate, and two drive rods each extending along a (faceplate/drive rod) longitudinal direction, wherein the drive rods can each be driven by means of the drive means and, when driven by means of the drive means, can be displaced along the longitudinal direction, wherein a coupling means for coupling a drive bolt is attached to each of the two drive rods, wherein the coupling means each have a receptacle into which one of the drive bolts can be inserted with an end section, wherein the coupling means and the drive bolts are each configured in such a way that the drive bolt is coupled to the corresponding coupling means by latching when the end section is inserted into the corresponding receptacle.

The locking device can optionally be designed as a drive bolt lock or as a multi-point locking system.

The aforementioned object is also achieved by a door assembly having the features of the independent claim. The door assembly has a frame and at least one door leaf pivotably mounted on the frame. The door leaf comprises a locking device with one or more of the aspects described above. With regard to the advantages that can be achieved thereby, reference is made to the statements relating to the locking device in this respect.

The door assembly can have one door leaf (single-leaf door assembly) or two door leaves (double-leaf door assembly). In a double-leaf door assembly, it is possible for only one of the door leaves to be equipped with the locking device, wherein this one door leaf can be the active leaf (active leaf) or the passive leaf (passive leaf). A design of the passive leaf with the locking device allows locking (drive bolt) of the passive leaf on the side opposite the hinge. This contributes to a stable locking of the active leaf to the passive leaf. A design of the active leaf with the locking device promotes a seal between the active leaf and the frame, especially for doors with a height of more than 2 meters (high wind loads).

It is also conceivable that in a double-leaf door assembly both door leaves are equipped with a locking device. This contributes to a high level of security and extensive sealing of the door leaves relative to the door frame. The drive means of the locking device of the passive leaf can be designed as a passive lock with latch and/or bolt receptacle, which can optionally have a latch and/or bolt ejector. The drive means of the locking device of the active leaf can be designed as an active lock with latch and/or bolt, which, when the door leaf is in the closed position, are aligned with the latch and/or bolt receptacle of the passive lock and can penetrate into it. The active lock and passive lock can be formed as described above.

In a preferred embodiment, a recess for the drive means, a clearance for the faceplate, at least one further clearance for the coupling means and/or at least one bolt channel (for concealed installation) for the drive bolt can be formed in the door leaf. This contributes to the integration of the components of the locking device into the door leaf. This allows the components of the locking device to be integrated into the door leaf so that they are protected from environmental influences and manipulation.

The invention is also achieved by a method for installing a locking device on a door assembly.

This is a method for installing a locking device, in particular a locking device with one or more of the aspects described above, on a door assembly with at least one frame and a door leaf pivotably mounted on the frame, the method comprising the following steps:

a. inserting the drive means into a recess for the drive means, and inserting the at least one coupling means into at least one further clearance, and inserting the faceplate into a clearance on the door leaf for the faceplate;
b. at least partially screwing the faceplate to the door leaf;
c. inserting at least one drive bolt into a bolt channel formed on the door leaf for the drive bolt; and
d. inserting an end section of the drive bolt into the coupling means, wherein the drive bolt is coupled to the coupling means by latching when the end section is inserted into a receptacle of the coupling means.

If the locking device has two coupling means, and two bolt channels are provided on the door leaf, two drive bolts can be inserted into the bolt channels for drive bolts formed on the door leaf (one drive bolt per drive bolt channel). An end section of the drive bolt can then be inserted into the respective coupling means, wherein the respective drive bolt is coupled to the coupling means by latching when the end section is inserted into a receptacle of the respective coupling means.

The above step a. can be described synonymously by the feature “positioning the locking device on the door leaf”, which includes the individual features as step a.

Before carrying out step a., at least one door leaf can be provided, wherein the door leaf has a recess for the drive means, a clearance for the faceplate, at least one further clearance for the coupling means, and/or at least one bolt channel (for concealed installation) for the drive bolt. If the locking device in question has two coupling means, two further clearances are formed on the door leaf, each for one coupling means. If two drive bolts are provided, two bolt channels are formed on the door leaf, each for one drive bolt.

Figure 1B:
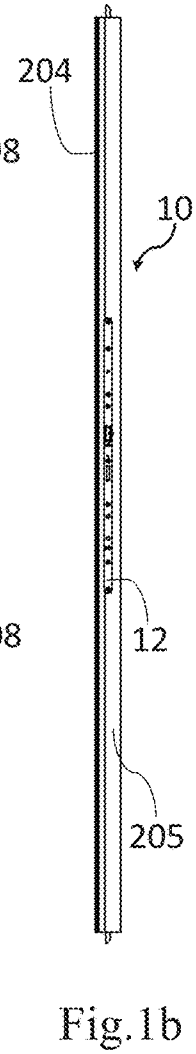
Figure 2A:
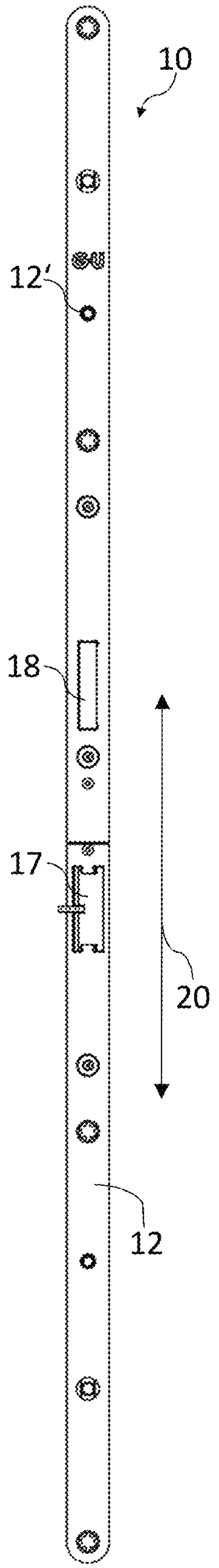
Figure 2B:
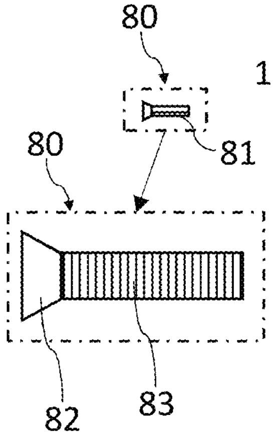
Figure 2B:
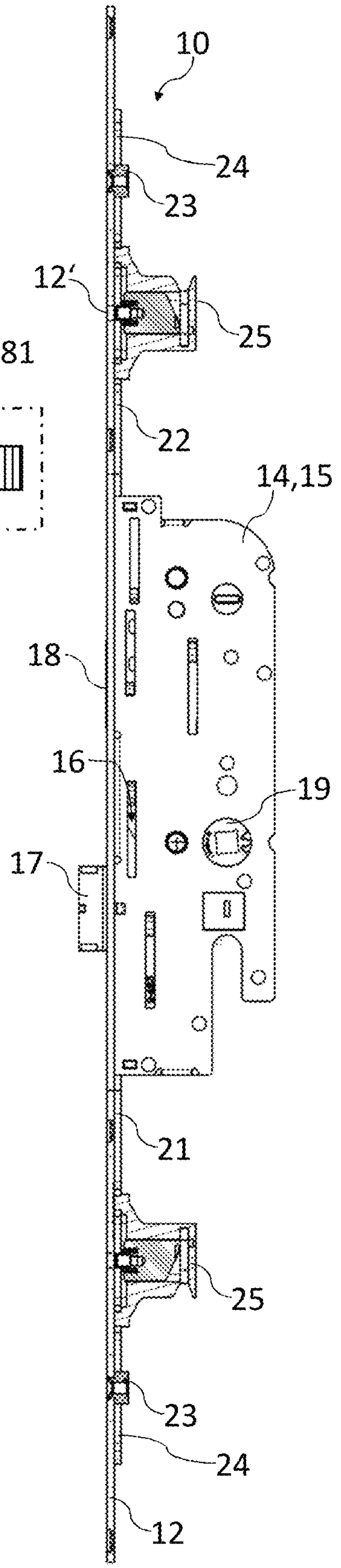
Figure 3:
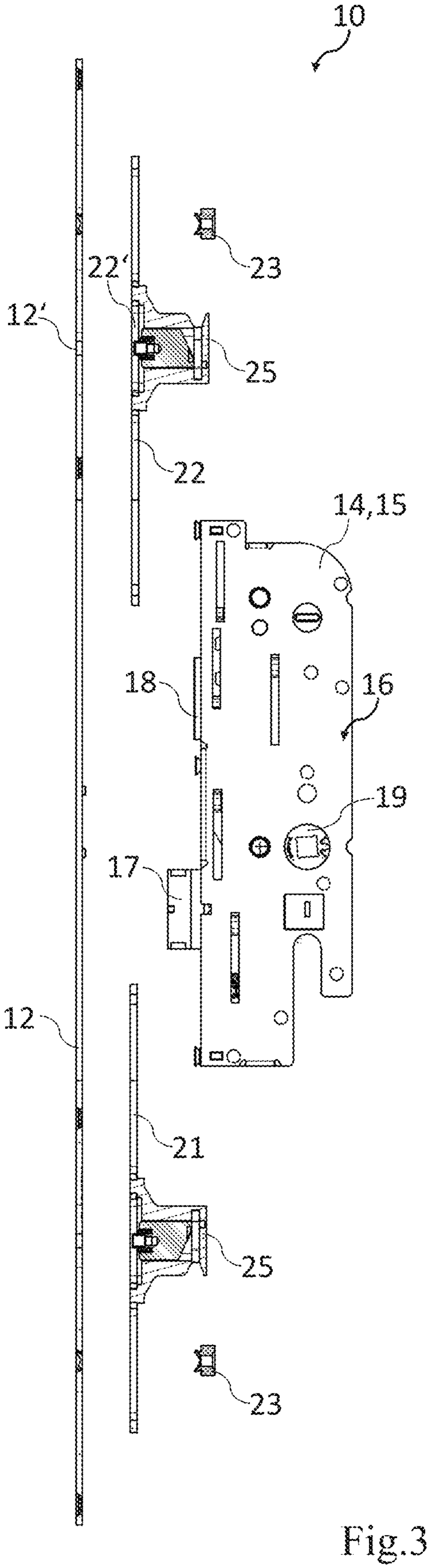
Figure 4A:
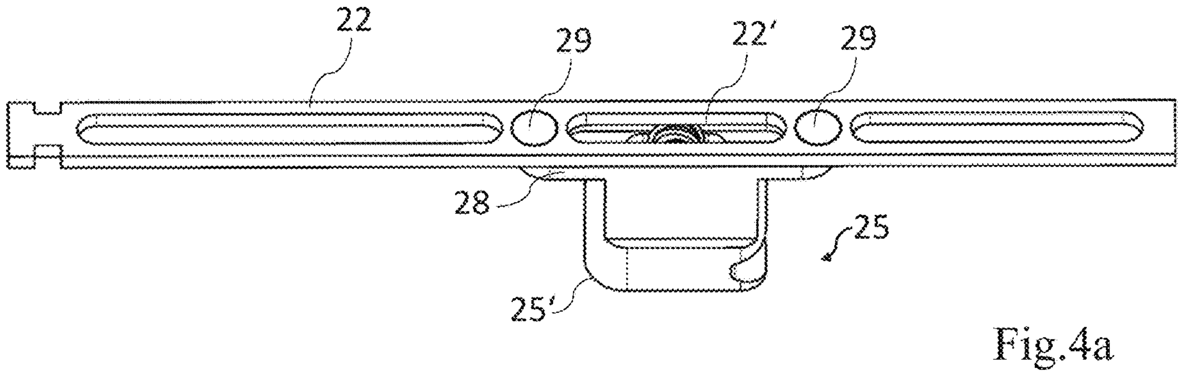
Figure 4B:
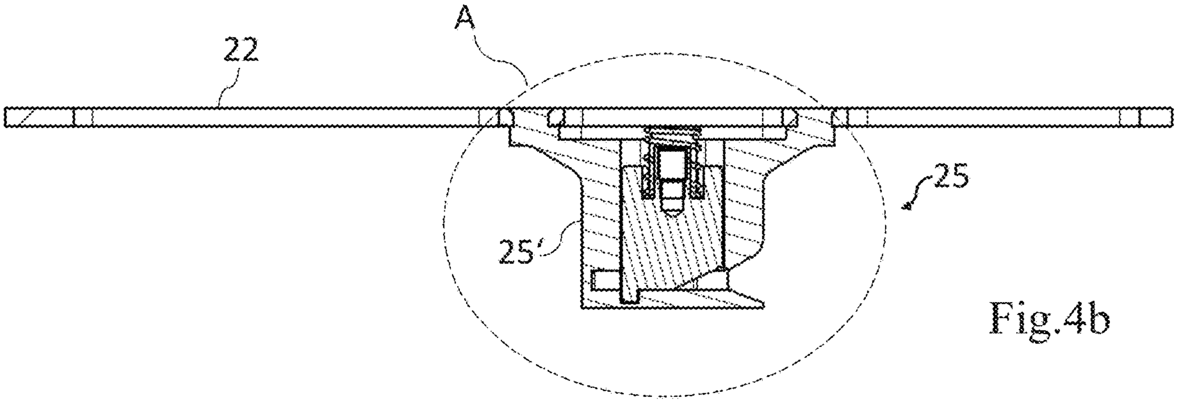
Figure 4C:
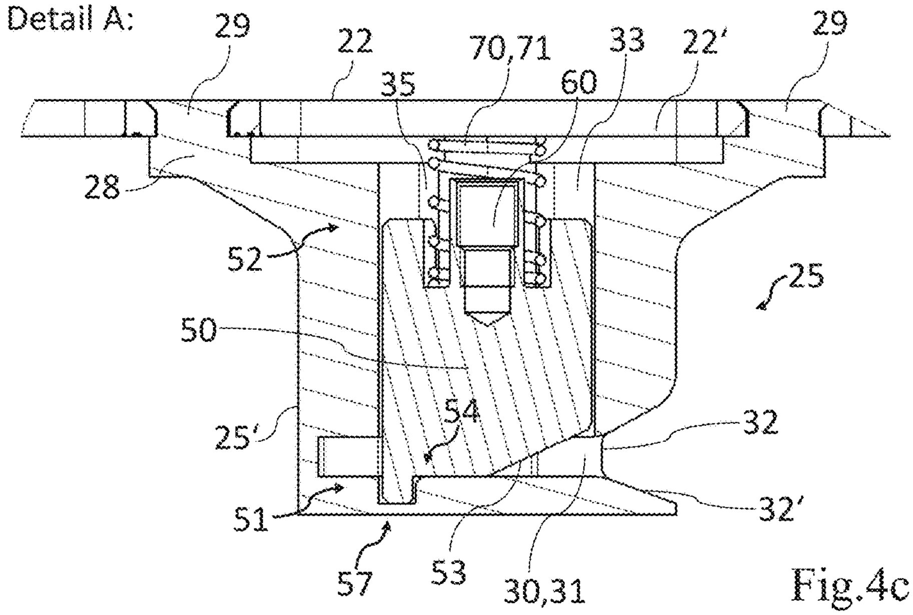
Figure 5A:
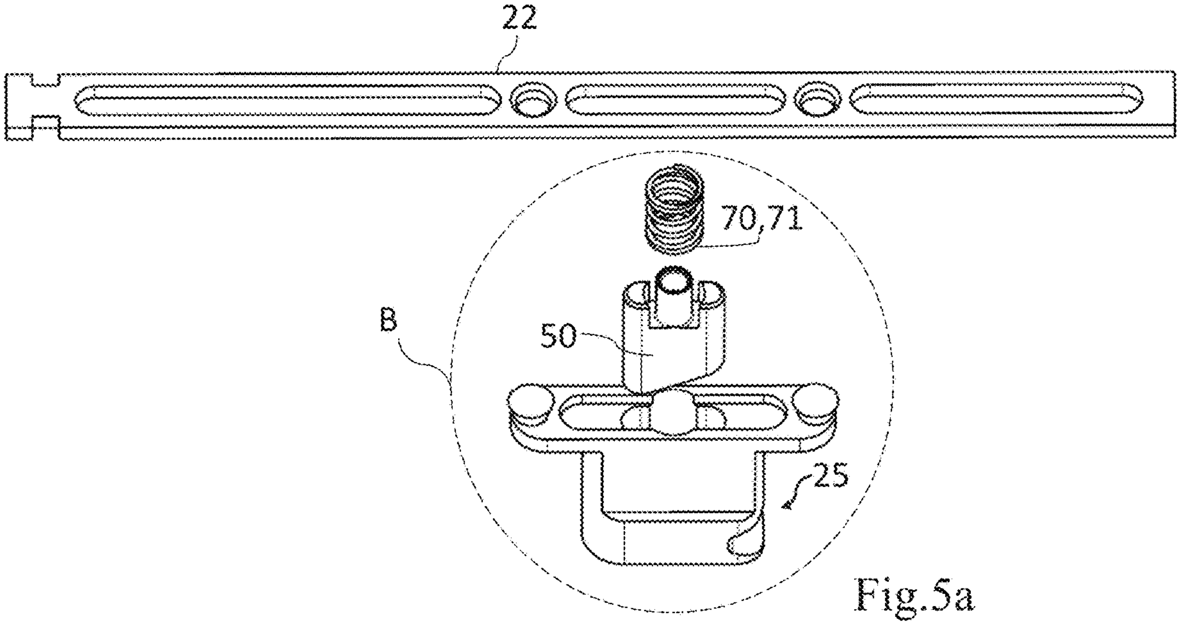
Figure 5B:
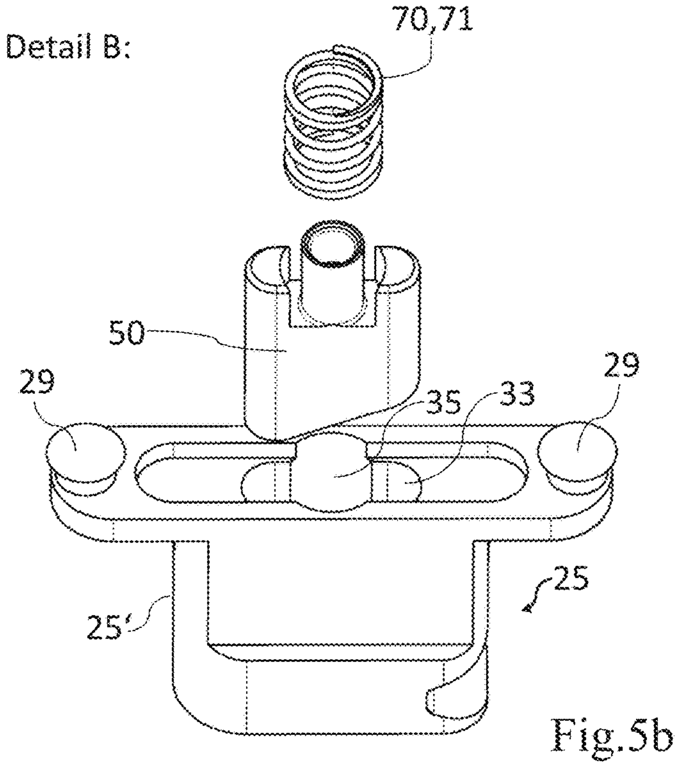
Figure 6A:
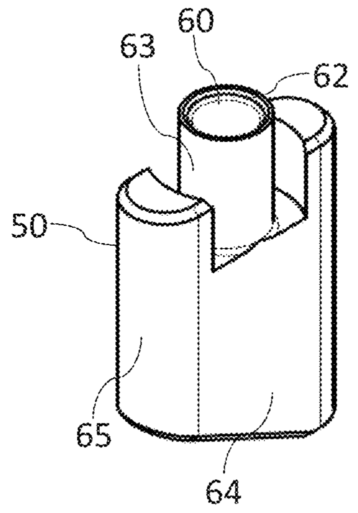
Figure 6B:
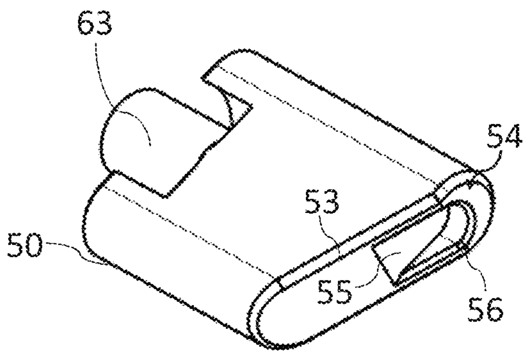
Figure 6C:
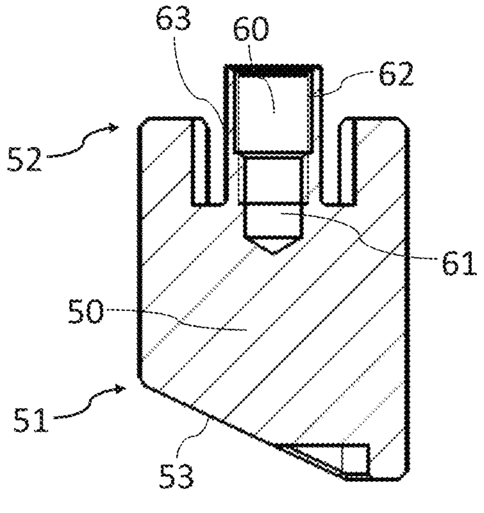
Figure 6D:
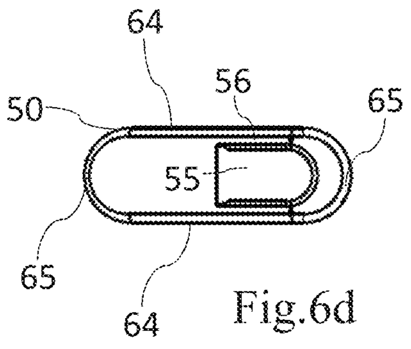
Figure 7A:
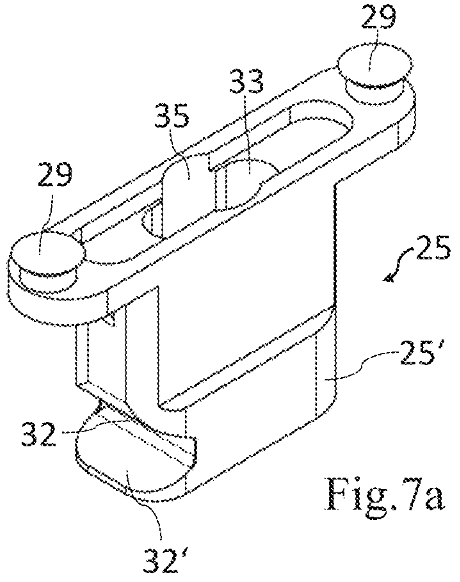
Figure 7B:
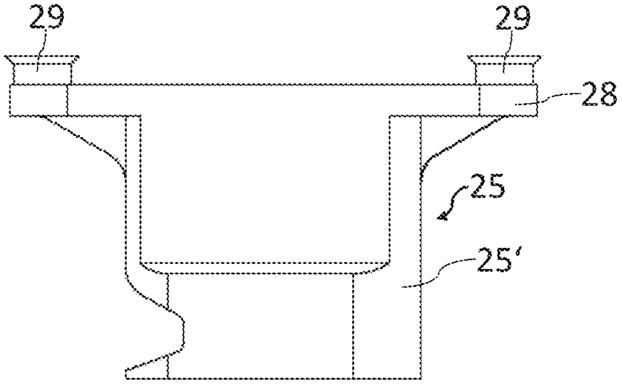
Figure 7D:
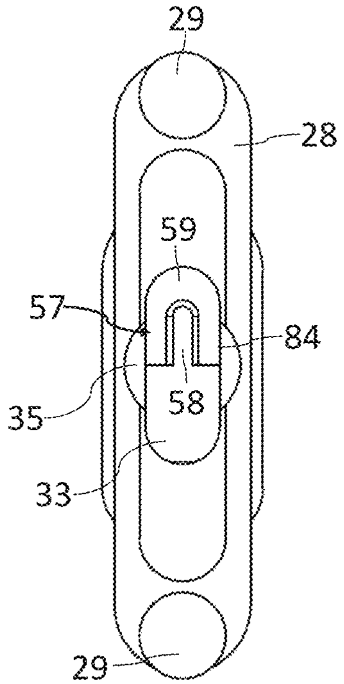
Figure 7C:
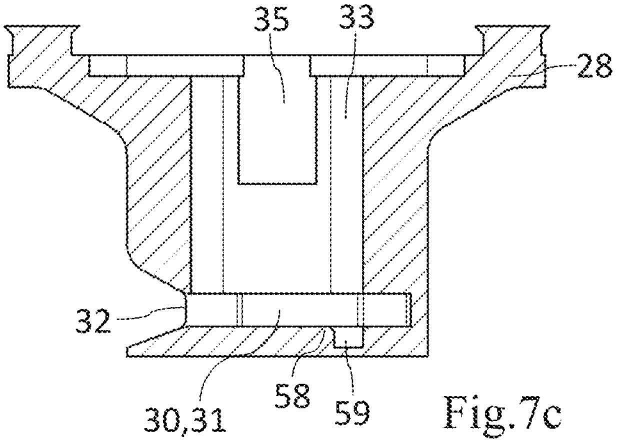
Figure 8:
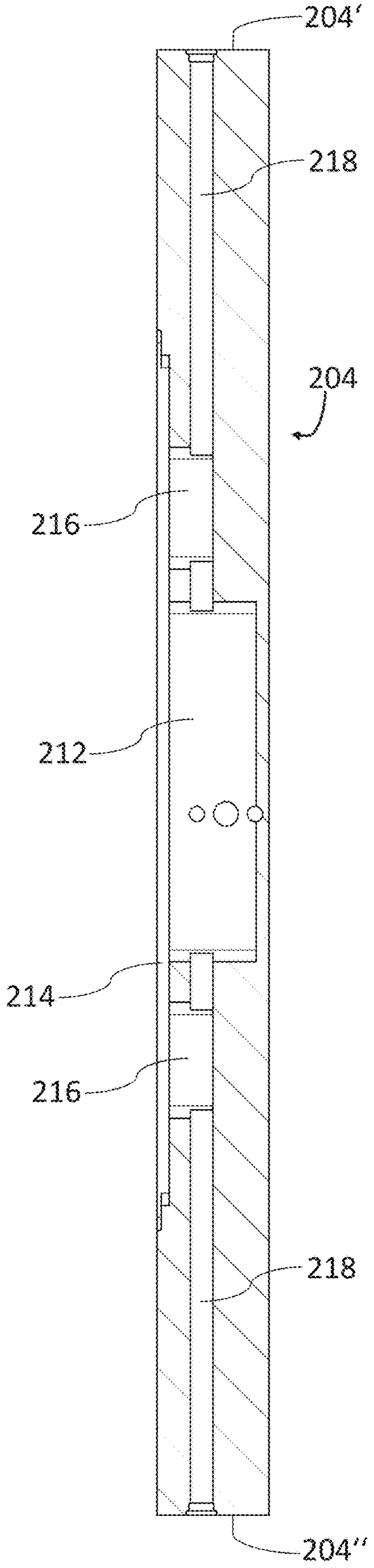
Figure 9A:
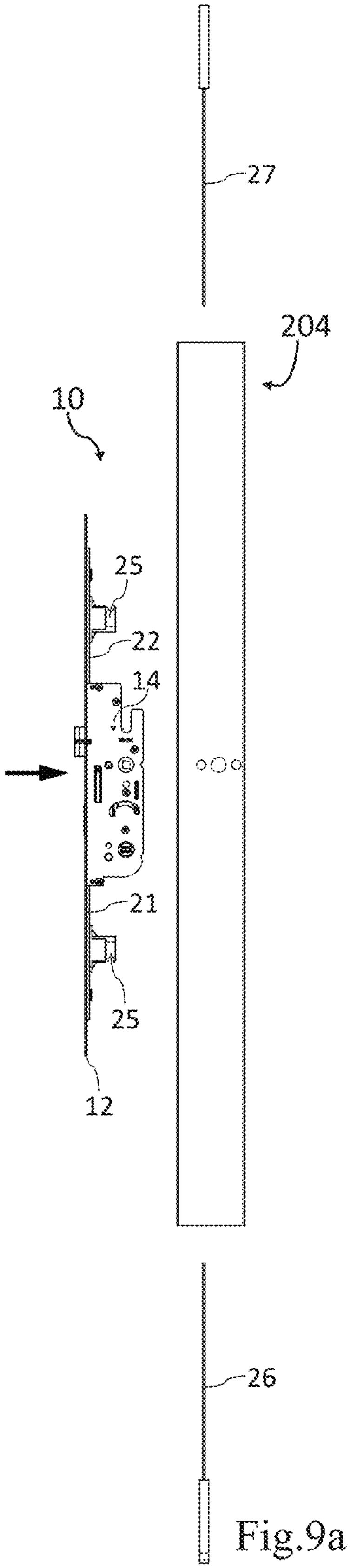
Figure 9B:
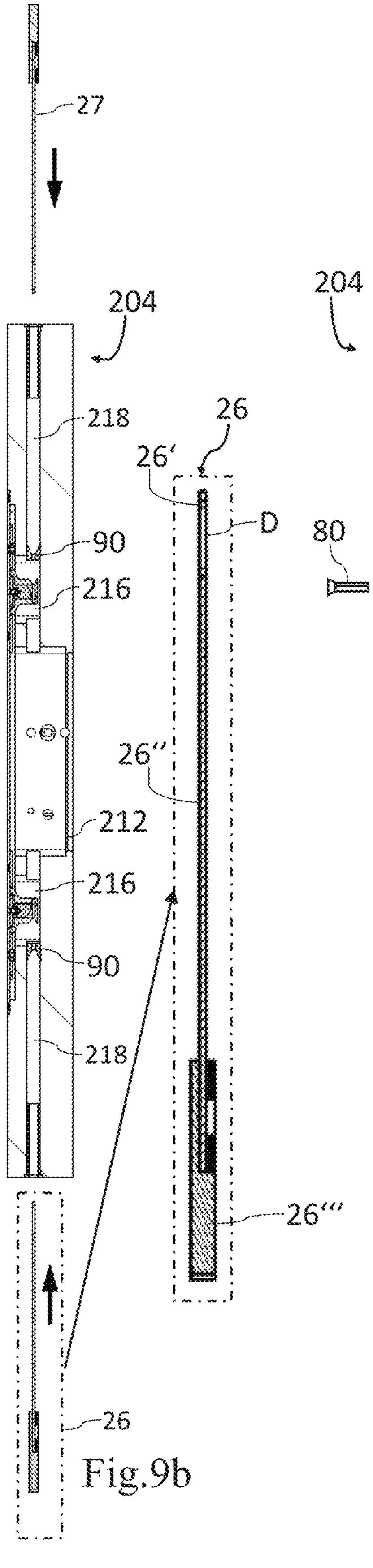
Figure 9C:
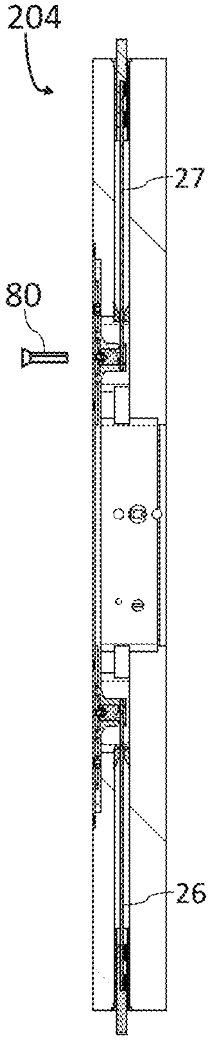

The invention is explained in more detail below with reference to the figures, wherein identical or functionally identical elements are provided with identical reference signs, but, where applicable, only once. In the drawings:

FIG. 1*a* is a door assembly with a frame, two door leaves pivotably mounted on the frame, one of which is equipped with a locking device, in a front view;

FIG. 1*b* is the door leaf equipped with the locking device, with a view of the exposed end face of the door leaf (opposite the hinge side);

FIG. 2*a, b* is the locking device in isolation, with a view of the faceplate (FIG. 2*a*) and in a partially sectioned side view (FIG. 2*b*);

FIG. 3 is the locking device in a partially sectioned exploded view;

FIG. 4*a-c* is the coupling means of the locking device in a perspective view (FIG. 4*a*), in a longitudinal section (FIG. 4*b*) and in an enlarged and sectional partial view (FIG. 4*c*);

FIG. 5*a, b* is the coupling means of the locking device in an exploded view (FIG. 5*a*) and an enlarged exploded view (FIG. 5*b*);

FIG. 6*a-d* is the locking element of the coupling means in an isometric view (FIG. 6*a*), a perspective view of the distal end of the locking element (FIG. 6*b*), a longitudinal section (FIG. 6*c*) and in a plan view of the distal end of the locking element (FIG. 6*d*);

FIG. 7*a-d* is the housing of the coupling means in an isometric view (FIG. 7*a*), a side view (FIG. 7*b*), a longitudinal section (FIG. 7*c*) and a top view with a view of the receiving opening for the locking element (FIG. 7*d*);

FIG. 8 is a longitudinal section through a section of a door leaf of the door assembly; and FIG. 9*a-c* is the method steps for installing the locking device on a door leaf of a door assembly, in multiple partially sectioned views.

FIG. 1*a* is a door assembly, which is designated as a whole by the reference numeral 200. The door assembly 200 has a frame 202, a first door leaf 204 pivotally mounted on the frame 202 and a second door leaf 206 pivotally mounted on the frame 202. The door leaves 204, 206 are each pivotably mounted on the frame 202 by means of door hinges 208, 210.

In the example, the first door leaf 204 is equipped with a locking device 10 (indicated in FIG. 1*a* by a dashed box 10). The locking device 10 is described in more detail further below.

FIG. 1*b* shows the first door leaf 204 equipped with the locking device 10, with a view of its end face 205. There, a part of the locking device 10 can be seen, in particular its faceplate 12.

FIGS. 2*a*, 2*b* and 3 show the locking device 10 in different views, each in a stand-alone position. The locking device 10 has the faceplate 12 and a drive means 14 attached to the faceplate 12. In the example, the drive means 14 is designed as a mortise lock 15, which has a lock gear 16 (not shown in detail), a latch 17, a bolt 18 and a handle follower 19.

In addition, the locking device 10 in the example has two drive rods 21, 22, each extending along a longitudinal direction 20. The longitudinal direction 20 extends along or parallel to the faceplate 12. The drive rods 21, 22 can be driven by means of the drive means 14 and, when driven by means of the drive means 14, can be displaced along the longitudinal direction 20. Specifically, the lock gear 16 can be driven by actuating the handle follower 19, wherein, for example, the latch 17 and also the drive rods 21, 22 are displaced accordingly.

The drive rods 21, 22 are each coupled to the drive means 14, in particular coupled to its lock gear 16, and guided on the faceplate 12 by means of guide elements 23 coupled to the faceplate 12. In the example, the guide elements 23 engage in corresponding recesses 24 in the drive rods 21, 22.

A coupling means 25 for coupling a drive bolt 26, 27 (cf. FIG. 1*b*, 9*a* or 9*b*) is attached to each of the drive rods 21, 22.

The structure and functioning of the coupling means 25 are described in more detail with reference to FIGS. 4*a* to 7*d*, using the example of the drive rod 22. The drive rod 21 and its coupling means 25 are constructed analogously.

The coupling means 25 has a housing 25' which has a flange section 28, via which the housing 25' of the coupling means 25 is fastened to the drive rod 22. In the example, the housing 25' is attached to the drive rod 22 via two fastening points 29, e.g. screwed or riveted (only shown schematically).

In the housing 25' of the coupling means 25, a receptacle 30 for an end section of a drive bolt 26, 27 is formed. In the example, the receptacle 30 is designed as a receiving slot 31 which is open to the outside only towards its insertion opening 32. The receptacle 30 has an insertion bevel 32' which widens conically opposite to the insertion direction of the drive bolt 26, 27 (i.e. from the insertion opening 32 outwards). Furthermore, a locking element guide opening 33 is formed in the housing 25', which is open towards the flange section 30 (i.e. "upwards" towards the drive rod 22) and opens into the receptacle 30.

A locking element 50 for coupling the drive bolt 26, 27 is slidably mounted in the locking element guide opening 33. The locking element 50 is displaceable between a coupling position (cf. FIG. 4*b* or 4*c*), in which the locking element 50 engages in the receptacle 30 for coupling with the drive bolt 26, 27, and a release position (not shown) in which the locking element 50 uncovers the receptacle 30 for decoupling the drive bolt 26, 27 (the locking element 50 is at least partially or completely displaced out of the receptacle 30 in the release position). The coupling means 25 is designed such that the locking element 50 is displaced further away from the drive rod 22 in the coupling position than in the release position.

The locking element 50 is preloaded into the coupling position, i.e., away from the drive rod 22, by means of a spring element 70—in the example, with a helical compression spring 71. In the example, the spring element 70 is supported at one end on the drive rod 22 and at the other end on the locking element 50. In the example, spring receptacle sections 35 are formed on the locking element guide opening 33 (cf. FIG. 4*c* or 5*b*), and widen the cross-section of the locking element guide opening 33 such that the spring element 70 can be arranged in the locking element guide opening 33.

At the distal end 51, the locking element 50 has an insertion bevel 53. As a result, the locking element 50 can be displaced from the coupling position (cf. FIG. 4*c*) towards the release position (release position not shown) by inserting an end section of the drive bolt 26, 27 into the recess 30.

The locking element 50 has a first profile feature 54 at its distal end 51 (cf. FIG. 4*c*). The first profile feature 54 is designed as a recess 55 with wall sections 56 on the edges projecting beyond the recess 55 (cf. FIG. 6*b* or 6*d*). The receptacle 30 has a second profile feature 57 that corresponds to the first profile feature 54 and is complementary in the example. The second profile feature 57 is designed as a projection 58 with a recess 59 on the edge, in the example in a U-shape (cf. FIG. 7*d*). The first profile feature 54 and the second profile feature 57 engage with each other to provide anti-jamming protection when the locking element 50 is in the coupling position (cf. FIG. 4*c*).

At its proximal end 52, the locking element 50 has a threaded section 60. The threaded section 60 is formed as a bore 61 with an internal thread 62. In the example, the bore 61 with the internal thread 62 is formed in a pin-shaped section 63 protruding from the locking element 50, wherein the spring element 70 surrounds the pin-shaped section 63 in the assembled state (cf. FIG. 4*c*).

The drive rod 22 and the faceplate 12 each have a passage 12', 22' aligned with the threaded section 60 (cf. for example, FIGS. 2*a*, 2*b* and FIG. 3). Thus, an actuating element 80, which has a counter-threaded section 81 corresponding to the threaded section 60, can be passed through the passages 12', 22' and coupled to the threaded section 60. The actuating element 80 with counter-threaded section 81 is designed in the example as a screw 82 with an external thread 83 (cf. FIGS. 2*a* and 2*b*). Thus, by means of the actuating element 80, the locking element 50 can be actuated through the faceplate 12 and the drive rod 22—for example, it can be moved from the coupling position to the release position. As a result, a drive bolt 26, 27 can be uncoupled from the coupling means 25 "from the outside" without dismantling the locking device 10.

The locking element 50 has a cross-section which is delimited by two opposing, preferably parallel, flat sides 64 and two opposing narrow sides 65 connecting the flat sides 64 to one another, wherein the narrow sides 65 have a rounded, in the example each semicircular contour (cf. FIG. 6*d*). The locking element guide opening 33 has, at least in sections, a cross-section complementary to the locking element 50 (cf. FIG. 7*d*). Spring receptacle sections 35 for the spring element 70 are formed in flat sides 84 of the locking element guide opening 33.

The receptacle 30 is arranged on the coupling means 25 in such a way that a drive bolt 26, 27 coupled to the coupling means 25 is arranged offset away from the drive rod 22 on the side of the drive rod 22 facing away from the faceplate 12 (cf. FIG. 9*c*).

The structure of the drive bolt is explained using the drive bolt 26 as an example. The drive bolt 26 has an end section 26' (insertion section), a connecting section 26" and a locking section 26''' (cf. FIG. 9*b*). The end section 26' serves to couple the drive bolt 26 to the coupling means 25. The locking section 26''' serves for locking engagement with a door frame 202 (cf. FIGS. 1*a* and *b*). The connecting section 26" lies between the end section 26' and the locking section 26''' and connects them together. In the end section 26', a passage D is formed for engagement with the locking element 50.

The locking device 10 optionally has an insertion or centering aid 90. The insertion or centering aid 90 can be arranged and/or fastened in a drive rod channel 218 of a door assembly 200 (cf. FIG. 9*b*).

As already explained above, the coupling means 25 for coupling the drive bolt 27 is attached to the drive rod 22. The coupling means 25 has the receptacle 30 into which the drive bolt 27 can be inserted with its end section 27'. The coupling means 25 and the drive bolt 27 are designed such that the drive bolt 27 is coupled to the coupling means 25 by latching when the end section 27' is inserted into the receptacle 30.

The coupling means 25 is designed such that the coupling of the drive bolt 27 to the coupling means 25 is reversibly releasable. Thus, the actuating element 80 can be coupled to the locking element 50 and the locking element 50 can be moved into the release position. A previously coupled drive bolt 27 can thus be uncoupled from the coupling means 25 and removed.

FIG. 8 shows a section of the first door leaf 204 in a longitudinal section. A recess 212 for the drive means 14 is formed in the door leaf 204. In addition, a clearance 214 for the faceplate 12 is formed in the door leaf 204. Two further clearances 216 are formed in the door leaf 204—one for each coupling means 30. In addition, two concealed bolt channels 218 ("offset inwards in the door leaf 204") are formed in the door leaf 204, each for a drive bolt 26, 27. The bolt channels 218 each extend from one of the further clearances 216 and open into the upper side 204' or the lower side 204" of the door leaf 204. An insertion and centering aid 90 can optionally be inserted into the bolt channels 218 in the end region adjacent to the further clearance 216 (cf. FIG. 9*b*). The insertion or centering aid has a passage (without reference symbol) for the drive bolt 26, 27. In the example, the passage of the insertion or centering aid 90 expands against the insertion direction starting from the drive bolt cross-section, as explained above.

FIGS. 9*a* to 9*c* illustrate the method for installing a locking device 10 on a door assembly 200.

First, at least one door assembly 200 is provided, and has a frame 202 and at least one door leaf 204 which has recesses or clearances as described in connection with FIG. 8.

Before, at the same time, or after this, a locking device 10 is provided (cf. FIG. 9*a*). This is positioned on the door leaf

204 after it has been provided. For this purpose, the drive means 14 is inserted into the recess 212, the coupling means 25 are each inserted into the further clearances 216 and the faceplate 12 is inserted into the clearance 214. The locking device 10 is thus positioned in the installation position on the door leaf 204.

Thereafter, the faceplate 12 is at least partially or completely screwed to the door leaf 204. The faceplate 12 and the components of the locking device 10 attached thereto are thus fastened to the door leaf 204 (cf. FIG. 9*b*).

Before, at the same time or after this, the drive bolts 26, 27 are provided. After their provision, the drive bolts 26, 27 are each inserted into one of the bolt channels 218 formed on the door leaf 204 (cf. FIG. 9*b*).

As the insertion process continues, the end sections of the drive bolts 26, 27 are inserted into the coupling means 25. The drive bolts 26, 27 are coupled to the coupling means 25 by latching when the respective end section is inserted into the respective receptacle 30 of the coupling means 25.

If one or both of the drive bolts 26, 27 are to be removed again, the actuating element 80 in the form of the screw 82 can be screwed through the passage 12' in the faceplate 12 and the passage 22' in the drive rod 22 into the threaded section 60 in the form of the internal thread 62 of the locking element 50. If the screw 82 is then pulled outwards away from the faceplate 12, the locking element 50 is displaced from the coupling position towards the release position. The respective drive bolts 26, 27 can then be pulled out of the respective bolt channels 218 without the locking device 10 having to be dismantled or completely removed from the door leaf 204.

The invention claimed is:

1. A locking device for a door leaf of a door assembly, comprising:

a faceplate, a drive means attached to the faceplate, at least one drive rod extending along a longitudinal direction and at least one drive bolt, wherein the drive rod is configured to be driven by means of the drive means and is configured to be displaced along the longitudinal direction when driven by means of the drive means, wherein the drive rod is guided on the faceplate by means of guide elements coupled to the faceplate, a coupling means for coupling the at least one drive bolt, the coupling means being attached to the at least one drive rod, wherein the coupling means has a receptacle into which the drive bolt is configured to be inserted with an end section, wherein the coupling means and the drive bolt are designed such that the drive bolt is coupled to the coupling means by latching when the end section is inserted into the receptacle, wherein the coupling means has a housing in which a locking element is displaceably mounted, wherein the locking element is displaceable between a coupling position in which the locking element engages in the receptacle for coupling with the drive bolt, and a release position in which the locking element releases the receptacle for decoupling the drive bolt, and wherein the locking element has a threaded section at its proximal end, and the drive rod and/or the faceplate each have a passage aligned with the threaded section, such that an actuating element which has a counter-threaded section corresponding to the threaded section is configured to be guided through the passage and coupled to the threaded section.

2. The locking device according to claim 1, wherein the coupling means is designed such that the coupling of the drive bolt to the coupling means is reversibly releasable.

3. The locking device according to claim 1, wherein the locking element is preloaded into the coupling position by means of a spring element.

4. The locking device according to claim 1, wherein the locking element has an insertion bevel, such that the locking element is configured to be displaced from the coupling position in the direction of the release position by inserting the end section of the drive bolt into the receptacle.

5. The locking device according to claim 1, wherein the locking element has a first profile feature at its distal end, wherein the receptacle has a second profile feature corresponding to the first profile feature, wherein the first profile feature and the second profile feature engage with one another when the locking element is in the coupling position.

6. The locking device according to claim 1, wherein the threaded section is designed as a bore with an internal thread and/or that the actuating element with counter-threaded section is designed as a screw with an external thread.

7. The locking device according to claim 6, wherein the bore with internal thread is formed in a pin-shaped section, wherein a spring element surrounds the pin-shaped section.

8. The locking device according to claim 1, wherein the locking element has a cross-section which is delimited by two mutually opposite flat sides and two mutually opposite narrow sides connecting the flat sides to one another, wherein the narrow sides have a rounded contour.

9. The locking device according to claim 1, wherein the receptacle is arranged on the coupling means in such a way that a drive bolt coupled to the coupling means is arranged offset away from the drive rod on the side of the drive rod facing away from the faceplate.

10. The locking device according to claim 9, wherein the drive bolt has an end section, a connecting section, and/or a locking section.

11. The locking device according to claim 1, wherein the housing of the coupling means has a flange section for fastening the coupling means to the drive rod.

12. The locking device according to claim 1, wherein the locking device has an insertion or centering aid for the drive bolt.

13. The locking device according to claim 1, wherein the receptacle of the coupling means has an insertion bevel.

14. A door assembly having a frame and at least one door leaf pivotably mounted on the frame, wherein the door leaf has the locking device according to claim 1.

15. The door assembly according to claim 14, wherein a recess for the drive means, a clearance for the faceplate, at least one further clearance for the coupling means and/or at least one bolt channel for the drive bolt are formed in the door leaf.

16. A method for installing the locking device according to claim 1, on a door assembly having a frame and at least one door leaf pivotably mounted on the frame, the method comprising the following steps:

a. inserting the drive means into a recess for the drive means and inserting the coupling means into at least one further clearance, and inserting the faceplate into a clearance on the door leaf for the faceplate;

b. at least partially screwing the faceplate to the door leaf;

c. inserting at least one drive bolt into a corresponding bolt channel formed on the door leaf for the drive bolt; and d. inserting an end section of the drive bolt into the coupling means, wherein the drive bolt is coupled to the coupling means by latching when the end section is inserted into a receptacle of the coupling means.

* * * * *